United States Patent
Crisler et al.

(10) Patent No.: US 12,422,937 B1
(45) Date of Patent: Sep. 23, 2025

(54) TECHNIQUES FOR 3-D SCENE DECOMPOSITION, INTEROPERABILITY AND CROSS-DEVICE COMPATIBILITY FOR MIXED REALITY EXPERIENCES

(71) Applicant: Microsoft Technology Licensing, LLC, Redmond, WA (US)

(72) Inventors: Matthew C. Crisler, Redmond, WA (US); Yaying Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/680,431

(22) Filed: May 31, 2024

(51) Int. Cl.
| | |
|---|---|
| *G06F 3/01* | (2006.01) |
| *G06F 40/295* | (2020.01) |
| *G06F 40/35* | (2020.01) |
| *G06T 7/73* | (2017.01) |

(Continued)

(52) U.S. Cl.
CPC ............ *G06F 3/017* (2013.01); *G06F 40/295* (2020.01); *G06F 40/35* (2020.01); *G06T 7/73* (2017.01); *G06T 15/06* (2013.01); *G06T 19/006* (2013.01); *G06T 2200/04* (2013.01); *G06T 2200/24* (2013.01); *G06T 2207/30196* (2013.01)

(58) Field of Classification Search
CPC ......... G06T 19/006; G06T 7/73; G06T 15/06; G06T 2200/04; G06T 2200/24; G06T 2207/30196; G06F 3/017; G06F 40/295; G06F 40/35
See application file for complete search history.

(56) References Cited

U.S. PATENT DOCUMENTS

| | | | |
|---|---|---|---|
| 2020/0067998 A1* | 2/2020 | Pilnock | .................. A63F 13/77 |
| 2020/0257721 A1* | 8/2020 | McKinnon | .......... G06F 16/5854 |
| 2020/0265548 A1 | 8/2020 | Burleigh | |

(Continued)

FOREIGN PATENT DOCUMENTS

| | | |
|---|---|---|
| CN | 110362209 B | 8/2023 |

OTHER PUBLICATIONS

International Search Report and Written Opinion received for PCT Application No. PCT/US2025/020788, mailed on Jul. 7, 2025, 16 pages.

*Primary Examiner* — Premal R Patel
(74) *Attorney, Agent, or Firm* — Schwegman Lundberg & Woessner, P.A.

(57) ABSTRACT

Interactive methods and systems for converting three-dimensional (3-D) mixed-reality experiences into two-dimensional (2-D) representations are disclosed. A system comprises a 3-D-to-2-D decomposition engine that analyzes a data model of a 3-D environment to ascertain the positions, orientations, and activities of users, objects, and places within the environment. A 2-D user interface engine generates intuitive interface elements for display on conventional devices such as mobile phones, tablets, and laptops. The interface allows users to navigate the 3-D space efficiently through a series of interactive buttons representing conversation groups, individual users, and objects. Virtual cameras capture various perspectives within the 3-D environment, which are then processed to create a coherent 2-D representation for the user. This approach enables inclusive collaboration across a diverse range of devices and user capabilities, expanding the reach of mixed-reality technologies.

20 Claims, 9 Drawing Sheets

(51) Int. Cl.
    *G06T 15/06*     (2011.01)
    *G06T 19/00*     (2011.01)

(56)     References Cited

U.S. PATENT DOCUMENTS

| | | |
|---|---|---|
| 2020/0285311 A1 | 9/2020 | Lindh |
| 2020/0328908 A1* | 10/2020 | Howland ................ H04L 9/008 |
| 2021/0160644 A1 | 5/2021 | Olivieri |
| 2022/0124130 A1 | 4/2022 | Punwani |
| 2022/0317830 A1 | 10/2022 | Skuratowicz |
| 2023/0282224 A1* | 9/2023 | Chun .................. G10L 21/0232 |
| | | 381/56 |
| 2024/0019979 A1 | 1/2024 | Singh |
| 2024/0104859 A1* | 3/2024 | Chand ..................... G06F 3/011 |
| 2024/0290041 A1* | 8/2024 | Bove, Jr. ................. G06F 3/011 |
| 2024/0380722 A1* | 11/2024 | Maeda .................. G06F 40/279 |
| 2024/0404206 A1* | 12/2024 | Chiu ................... G06F 3/04815 |

* cited by examiner

TECHNIQUES FOR 3-D SCENE DECOMPOSITION, INTEROPERABILITY AND CROSS-DEVICE COMPATIBILITY FOR MIXED REALITY EXPERIENCES

TECHNICAL FIELD

The present application pertains to the technical field of computer-implemented mixed-reality environments and user interface technology. More specifically, the present application involves techniques for interpreting and converting experiences presented in three-dimensional (3-D) mixed-reality environments, such as those experienced via mixed-reality headsets, into two-dimensional (2-D) representations that can be presented on conventional display devices, including computer displays, mobile phones, or tablet computing devices.

BACKGROUND

The advent of mixed-reality technology has marked a significant leap forward in the realm of digital interaction, blending the physical world with virtual elements to create immersive experiences that transcend the boundaries of traditional computing environments. Central to this technological revolution is the development of mixed-reality environments, which are experienced primarily through advanced mixed-reality headsets. These environments are three-dimensional (3-D) spaces where users can interact with both real and virtual elements in real-time, fostering a new level of interaction, collaboration, and immersion. The ability to seamlessly merge digital content with the physical world opens up vast possibilities for educational, entertainment, and professional applications, among others. Mixed-reality technology leverages sophisticated sensors, cameras, and computing power to understand and interpret a user's physical environment, allowing for the precise placement and interaction with virtual objects as if they were part of the real world.

Despite the immersive capabilities of mixed-reality environments, there remains a significant portion of the user base that interacts with digital content through conventional two-dimensional (2-D) devices, such as conventional computers, smartphones, and tablets. These devices, ubiquitous in today's digital age, offer a different form of content consumption and interaction, relying on traditional input methods such as touch, mouse, and keyboard. The challenge lies in bridging the gap between the immersive, 3-D experiences provided by mixed-reality technology and the flat, 2-D interfaces of conventional devices. Achieving this requires innovative techniques to interpret and convert the spatially rich content of mixed-reality environments into formats that are not only compatible with 2-D endpoints but also preserve the essence and dynamic interactions of the original 3-D experience. This cross-device compatibility is important for ensuring that the transformative potential of mixed-reality technology can be accessed and enjoyed by a broader audience, regardless of the hardware at their disposal, thereby facilitating greater interoperability and a more unified digital experience across different platforms and devices.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
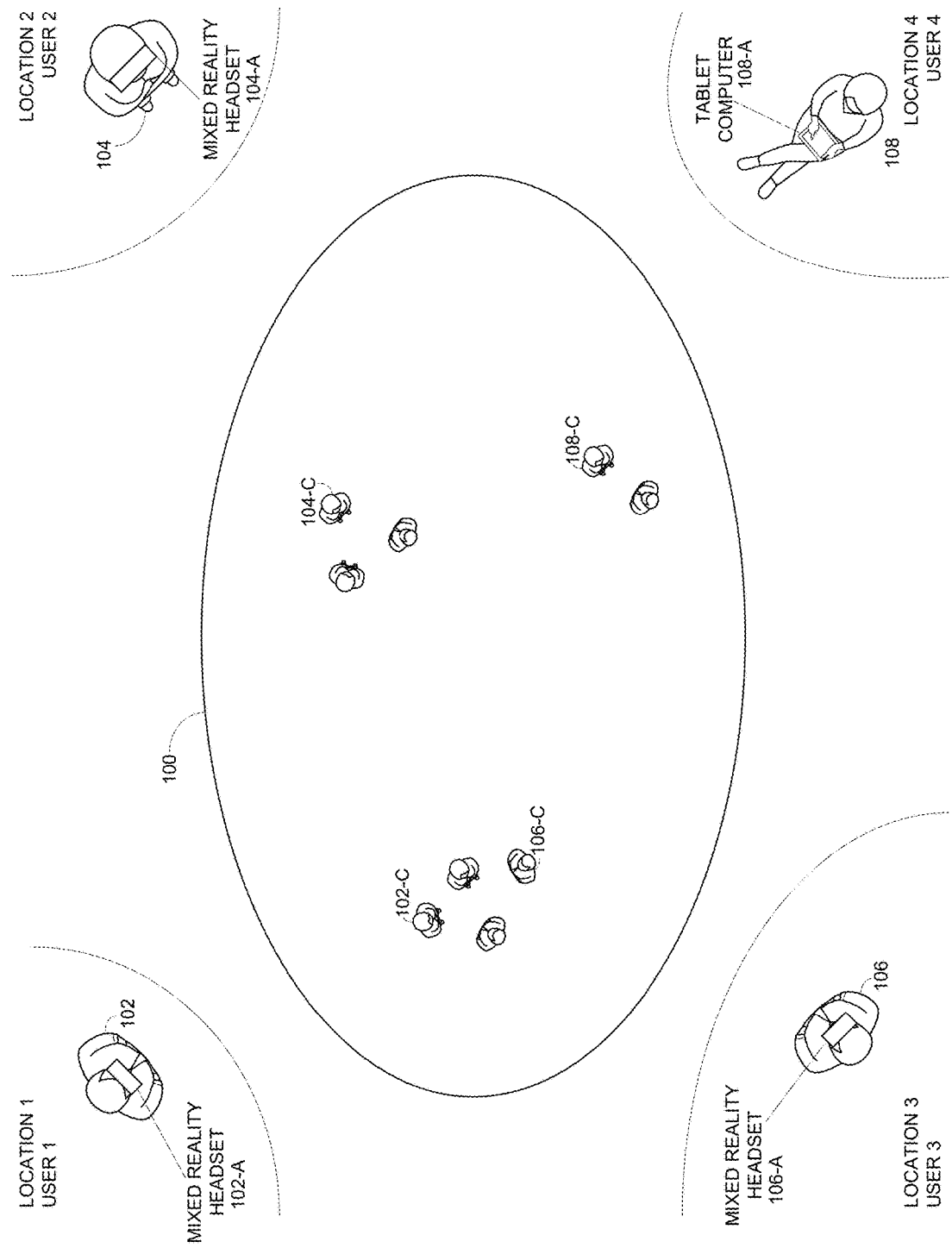
FIG. 1 is a diagram illustrating an example three-dimensional (3-D) virtual environment in which various users are collaborating, using various devices including mixed-reality headsets and conventional computing devices, such as a mobile phone, tablet computer, laptop or desktop, consistent with embodiments.

Described herein are techniques for transforming three-dimensional (3-D) mixed-reality experiences into two-dimensional (2-D) representations that are more suitable for devices not primarily designed for 3-D display capabilities. More specifically, the present disclosure outlines a method for decomposing 3-D mixed-reality environments into component elements-such as people, places, and things (e.g., objects)—and presenting these elements in an optimized manner on standard 2-D interfaces, including but not limited to monitors of computers, mobile phones, and tablets. These devices, while capable of rendering 3-D scenes to a certain extent, are generally not optimized for such displays due to factors like small screen sizes and limited control interfaces. The techniques described herein enhance the interaction between users immersed in a 3-D mixed-reality environment and users operating through a 2-D interface, ensuring cross-device compatibility and an inclusive user experience. In the following description, for purposes of explanation, numerous specific details and operations are set forth to provide a thorough understanding of the embodiments of the present invention. It will be apparent, however, to one skilled in the art, that the present invention may be practiced with various modifications and alterations to the details and features described herein.

In the context of the present disclosure, the terms "two-dimensional," "2-D," "three-dimensional" and "3-D" are used to distinguish between two different types of user interfaces and experiences, despite both ultimately being displayed on devices that use two-dimensional screens such as wearable headsets, AR or "smart" glasses, monitors, mobile phones, and tablets. The distinction lies not in the physical dimensionality of the display technology but in the representation and interaction models facilitated by the software.

A "3-D environment" refers to a digital space where objects and elements are modeled with three-dimensional properties, including depth, and can be interacted with in ways that mimic real-world interactions. This environment is typically navigated using input devices that allow movement along three axes (x, y, and z). The visual representation of this environment is rendered from a perspective view, which provides a sense of depth and spatial relationships among objects within the scene. Users can move around, look around, and interact with objects as if they were in a physical space, with movements and viewpoints changing the rendered image accordingly.

Conversely, a "2-D environment" in this context refers to a user interface designed around two axes (x and y) without the explicit representation of depth as a navigable dimension. Interactions in a 2-D environment are generally limited to surface interactions such as clicking, dragging, and scrolling. The visual representation is typically orthogonal, where all elements are displayed without perspective distortion, emphasizing layout and arrangement over depth. This mode is particularly suited for traditional computing devices where input mechanisms like a mouse or touch screen are used to interact with flat elements.

In further clarification, the terms "3-D user" and "3-D device" refer to users and devices that interact within or display the 3-D environment as described. A "3-D user" engages with the digital space using devices that support three-dimensional interaction capabilities, such as virtual reality (VR) headsets. AR systems, or advanced motion tracking systems. These devices are capable of tracking user movements along three axes and translating them into the digital environment, thereby allowing the user to navigate and manipulate objects in a manner that simulates physical interaction. It is important to recognize that the interaction spectrum also includes scenarios where users, referred to as "3-D users," interact with 3-D environments through less immersive interfaces, such as 2-D screens. These interactions may involve using traditional input methods like arrow keys or touch gestures to navigate the 3-D space, which can be particularly challenging on smaller screens or for users with visual or motor impairments. Despite the immersive experience provided by more advanced devices, the actual display technology, such as the screens in VR headsets, still operates on a two-dimensional plane. The sense of depth and spatiality is achieved through software-driven visual rendering techniques such as stereoscopy, which presents slightly different images to each eye, creating a perception of depth.

A "3-D device" specifically refers to the hardware used to access or interact with the 3-D environment. This includes computers with powerful graphics processing capabilities, VR headsets, AR glasses, and other devices equipped with sensors and software designed to render and manage three-dimensional data. These devices output images that, while displayed on flat screens, are rendered in such a way as to provide a convincing illusion of three-dimensional space through visual depth cues and perspective changes responsive to user input.

On the other hand, a "2-D user" and a "2-D device" interact with and display the 2-D environment. A "2-D user" utilizes traditional interaction devices such as keyboards, mice, touchscreens, or trackpads to navigate and manipulate the user interface, which is designed without the simulation of depth beyond superficial graphical elements like shadows or overlays. The "2-D device" refers to standard computing devices such as desktop computers, laptops, tablets, and smartphones, which are primarily designed to display and operate within two-dimensional interfaces. Even when these devices are used to access content designed for 3-D interaction, such as viewing a 3-D model on a tablet, the display remains a flat, two-dimensional surface, and the interaction model does not inherently support depth as a navigable dimension.

It is important to recognize that both "3-D" and "2-D" devices ultimately utilize flat, two-dimensional displays. The categorization into "3-D" or "2-D" is based on the software capabilities and the intended user interaction model rather than the hardware's physical attributes. This distinction helps in understanding the scope and application of technologies discussed herein, ensuring clarity in how these terms are applied to user experiences and device functionalities within the context of mixed-reality and traditional computing environments.

In the burgeoning field of mixed-reality technologies, users are provided with rich, immersive 3-D experiences that offer significant advantages for collaboration, visualization, and interaction within virtual environments. However, a technical problem arises when considering the inclusivity and accessibility of such mixed-reality experiences. A substantial portion of potential users either do not possess mixed-reality-capable headsets or may not have them readily available. This creates a disparity in experience and limits the potential for collaborative interactions between users in mixed-reality environments and those using traditional 2-D interfaces.

The technical problem is further compounded by the limitations of conventional methods for rendering 3-D environments onto 2-D displays. These methods often involve direct rendering of the 3-D environment to the 2-D screen, which can be resource-intensive, requiring significant computational power and graphical processing capabilities that may not be available on all devices, particularly mobile devices with smaller screens and less powerful hardware. Additionally, the user experience is often suboptimal, as navigating a virtual environment presented in 3-D space using traditional 2-D input methods (e.g., keyboard, mouse, touch) can be cumbersome and unintuitive, leading to inefficiencies and a less engaging experience.

Furthermore, existing solutions that attempt to bridge the 3-D-to-2-D divide by creating separate experiences for 3-D and 2-D users fail to address the need for real-time interaction and collaboration between users across these modalities. Such divided experiences can isolate users, hinder the formation of social connections, and reduce the effectiveness of collaborative efforts. The technical challenge, therefore, is to provide techniques, systems, and methods that allow for a seamless and interactive experience for 2-D users, enabling them to engage with and contribute to the 3-D mixed-reality environment without the need for specialized hardware, while also minimizing the computational and display resources required for such participation. This approach ensures that users, regardless of their device capabilities, can participate fully in a unified digital environment, fostering inclusivity and enhancing collaborative dynamics.

Consistent with embodiments, a technical solution to these technical problems involves a technique for decomposing 3-D scenes into their constituent elements-people, places, and things (e.g., objects)—and presenting them in a manner that is optimized for 2-D interfaces. This approach not only simplifies the user experience by utilizing familiar 2-D interaction paradigms, but also incorporates accessibility interventions, such as compatibility with screen readers, which are generally not natively supported in 3D environments. Additionally, this method significantly reduces the computational load on the 2-D endpoint devices. By doing so, the techniques described herein enable users with varying hardware capabilities, including those with visual or other impairments, to participate fully in the mixed-reality environment. This democratizes access to mixed-reality technologies and fosters a more inclusive digital ecosystem, ensuring that all users can engage effectively regardless of their device or physical capabilities.

One aspect of the technical problem addressed by several of the techniques and devices described herein is the "impedance" issue inherent in the interoperability between 3-D and two-dimensional 2-D display environments. This impedance arises from the inherent differences in the presentation and interaction models of 3-D and 2-D systems. In a 3-D mixed-reality environment, users can navigate and interact with the virtual space in an intuitive and natural manner, akin to real-world interactions. However, when the same scenes and user experiences (UX) are rendered in a 2-D environment, the intuitive nature of these interactions is lost, leading to a disjointed and often frustrating user experience.

Various instances of the different techniques described herein address this technical problem by providing a system that enables users in a 2-D environment to interact with and understand a 3-D mixed-reality environment without the need for direct rendering of the entire 3-D scene. This system decomposes the 3-D environment into a structured representation that is amenable to 2-D interaction paradigms, thereby resolving the impedance issue and allowing for effective interoperability between users in both environments. The improved techniques further facilitate the formation of conversation groups and the prioritization of content, ensuring that 2-D users can engage in meaningful interactions with their 3-D counterparts.

FIG. 1 is a diagram illustrating an example 3D virtual environment 100 in which various users are collaborating, using various devices including mixed-reality headsets and conventional computing devices, such as a mobile phone, tablet computer, laptop, or desktop, consistent with embodiments. The virtual environment 100 is depicted from a top-down view, which serves as a simplified representation for illustrative purposes and is not intended to convey the immersive 3-D view experienced by users with mixed-reality headsets.

Within this virtual environment 100, User 1, denoted by reference number 102, is engaging with the environment using a mixed-reality headset 102-A. The presence of User 1 in the virtual environment is indicated by reference number 102-C, which may represent their avatar or other virtual representation. User 1, 102-C, is shown in proximity to User 3, denoted by reference number 106 at location 3 and 106-C in the virtual environment. User 3 106 is also participating in the virtual environment through their mixed-reality headset 106-A. The positioning of User 1, 102-C, and User 3, 106-C, in the virtual environment 100 suggests the possibility of a conversation or interaction taking place between them.

In contrast to the 3-D experience of Users 1 and 3, User 4, denoted by reference number 108, is interacting with the virtual environment 100 through a tablet computer 108-A. The experience of User 4 is facilitated by a technique, consistent with one example embodiment, that decomposes the 3-D virtual environment into a 2-D representation suitable for display on the tablet computer 108-A. This 2-D representation is designed to provide User 4 with a coherent and navigable view of the virtual environment 100, allowing them to understand the spatial relationships and interactions occurring within the 3-D space, despite the limitations of the 2-D display.

Within the 2-D experience on the tablet computer 108-A, User 4 encounters a transformed representation of the 3-D virtual environment. This transformation is achieved through analysis of a model, representing the 3-D virtual environment, to ascertain the positions, orientations, and, when applicable, activities or behaviors of the 3-D representations of users, places, and objects. Through analysis of the model, the system identifies users who are proximate to one another within a predetermined distance and may form a "conversation group" to represent their collective presence in the 3-D space. Consequently, the 2-D user interface presents User 4 with a dedicated button for each identified conversation group, and in some cases, each person who is not part of a conversation group. Upon selection of a button by User 4, the tablet interface automatically transitions to display the conversation group from a predetermined virtual camera perspective, thus streamlining navigation and collaboration for the user.

This methodology extends to the presentation of objects within the virtual environment, which may include documents such as PowerPoint presentations, videos, text files, or even 3-D models. When an object becomes a focal point of discussion or interaction within the 3-D environment, the system assigns one or more virtual cameras to capture and convey the object's presence and relevance. In the 2-D experience, User 4 can select an object through the interface to view it from an optimal angle, allowing for an informed and engaged interaction with the content. The system dynamically prioritizes objects based on user interactions, ensuring that the most pertinent content is readily accessible to User 4.

Similarly, specific locations or positions within the 3-D environment that hold significance—such as presentation stages, workstations, or areas of high user activity—are monitored by virtual cameras. These cameras generate views that are then presented to User 4 in the 2-D experience, providing them with a sense of presence and situational awareness. For instance, if a particular area in the virtual environment becomes the hub of an impromptu gathering or a scheduled event, User 4 will be able to join and observe the activity through a corresponding view in the 2-D interface.

The 2-D experience is thus a curated and responsive representation of the 3-D environment, designed to maintain the immersive qualities of the original space while adapting to the constraints and capabilities of 2-D interaction.

Through the use of virtual cameras and intelligent interface design, the system ensures that User 4 is not merely a passive observer but an active participant in the virtual environment, and able to quickly navigate the virtual space. This approach not only enhances the accessibility of mixed-reality technologies for users without 3-D-capable devices but also enriches the collaborative potential of the virtual space by seamlessly integrating diverse user experiences.

Figure 2:
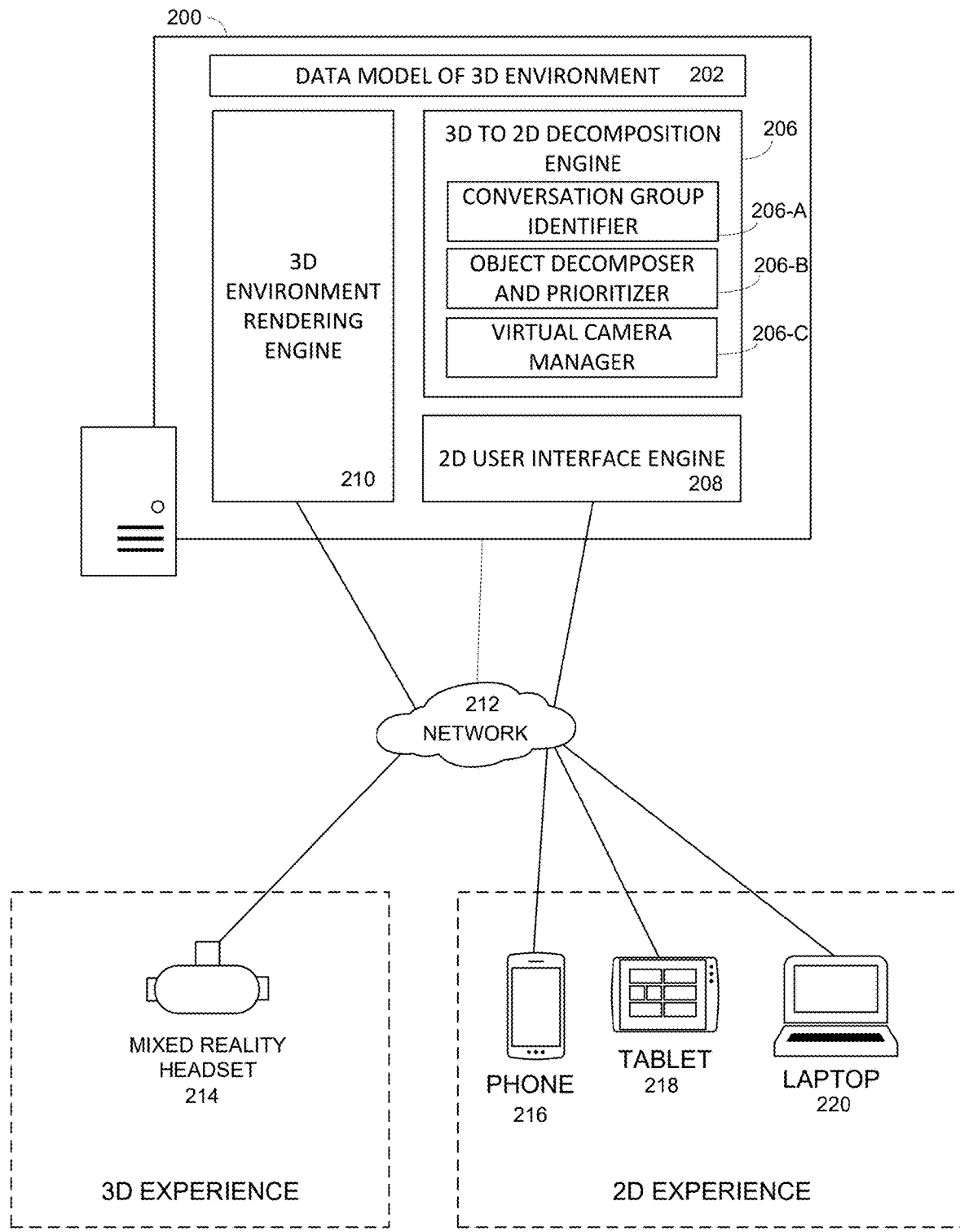
FIG. 2 is a diagram illustrating an example computer-based system configured to interpret and convert a virtual scene presented in 3-D mixed-reality environments, such as those experienced via mixed-reality headsets, into two-dimensional (2-D) representations that can be presented on conventional 2-D devices, including computers, mobile phones, or tablet computing devices, consistent with some embodiments.

FIG. 2 is a diagram illustrating an example computer-based system 200 configured to interpret and convert a 3-D virtual scene presented in mixed-reality environments, such as those experienced via mixed-reality headsets, into 2-D representations that can be presented on conventional display devices, including computer displays, mobile phones, or tablet computing devices, consistent with some embodiments. The system 200 comprises a 3-D environment rendering engine 210, which is tasked with rendering views for users who are wearing proper mixed-reality headsets 214. This process is resource-intensive, requiring significant computational power, graphics processing capabilities, and memory bandwidth to maintain real-time, high-fidelity 3-D visualizations. The rendering engine 210 must process complex geometries, textures, lighting, and other graphical elements to create an immersive experience for the user, which can place a high demand on the hardware of the device 214.

In parallel, the 3-D-to-2-D decomposition engine 206 operates by analyzing the data model representing the 3-D environment 202. This analysis involves determining data that represents the characteristics of the people, places, and things within the 3-D environment, such as their position, orientation, and activity. For instance, the 3-D to 2-D decomposition engine 206 may track whether users are moving from one virtual space to another, engaging in conversations, collaborating, or interacting with other users or objects within the environment. This may be done, for example, by determining and analyzing the positions and orientations of the various representations of the people and objects within the virtual environment.

The conversation group identifier 206-A enhances the social dynamics within the virtual environment by intelligently grouping users into conversation groups based on their interactions and proximity. This component 206-A analyzes real-time data to determine which users are likely engaging in active dialogue or collaborative activities. By evaluating factors such as the proximity of avatars, their orientation, and communication patterns, the conversation group identifier 206-A dynamically forms or dissolves groups, ensuring that the social interactions within the virtual environment mirror natural human interactions. This functionality not only improves the user experience by making virtual interactions more intuitive and organized but also facilitates smoother communication and collaboration among users.

The object decomposer and prioritizer 206-B serves to enhance 2-D user engagement with the 3-D virtual environment by intelligently managing the visibility and interaction priority of objects within the 3-D space. This system component 206-B analyzes objects based on their relevance to the user's current activity, their contextual importance within the scene, and their interaction history. By prioritizing objects that are most likely to be of interest or use to the user, the object decomposer and prioritizer 206-B ensures that the virtual environment remains uncluttered and focused, thereby optimizing the user's navigational experience and interaction efficiency. This approach helps maintain user engagement and ensures that important objects are readily accessible when needed, enhancing the overall functionality and user satisfaction within the 3-D environment.

The object decomposer and prioritizer 206-B processes a variety of input data to accurately determine the priority of an object for presentation to a 2-D user. This data includes, but is not limited to, the user's current location within the virtual environment, their viewing angles, past interactions with various objects, and the objects' current states of activity (such as updates or interactions by other users). Additionally, contextual cues from the ongoing events or tasks within the environment, such as time-sensitive activities or user-defined preferences, are also considered. The system employs a sophisticated scoring algorithm that weighs these factors to assign a dynamic priority score to each object. Furthermore, relationship data between the user and other users, such as those derived from a social graph or a company organizational chart, is utilized to enhance the prioritization process. For instance, if an object is being interacted with by a user's manager or a key peer, especially in contexts like presentations or collaborative reviews, this relationship context can elevate the object's priority, ensuring that the user is alerted to these significant interactions.

In the 2-D interface, objects of higher priority are presented in a manner that ensures they are immediately noticeable and accessible. This may involve visually distinguishing these objects using highlights, borders, or animations, and strategically positioning them within the user interface to ensure optimal visibility. For instance, high-priority objects might be displayed at the center of the screen or in a dedicated "important items" panel. Furthermore, when the priority of an object exceeds a predefined threshold, the system may proactively notify the user. This notification could be a visual alert, such as a flashing icon, or an auditory signal, depending on the user's settings and the device capabilities. This proactive approach ensures that users remain aware of significant objects and changes within the 3-D environment, thereby enhancing interaction efficiency and ensuring that opportunities for engagement are not overlooked.

The virtual camera manager 206-C provides 2-D users with optimal views of the 3-D virtual environment, thereby bridging the gap between complex 3-D spaces and the simplified 2-D interfaces used on conventional devices. This component controls the positioning, orientation, and operation of virtual cameras within the environment, capturing scenes from perspectives that best convey the spatial and interactive essence of the 3-D world. The virtual camera manager 206-C processes these views into 2-D representations that are both comprehensible and navigable on smaller screens, ensuring that users receive a coherent and contextually rich visual experience. This functionality allows for maintaining the immersive quality of the virtual environment while accommodating the display limitations of various devices. In some instances, the virtual camera manager provides one a fixed view that is particularly suited for viewing on a 2-D device. This fixed view simplifies the user experience by presenting a stable and consistent perspective, which avoids the complexities and potential disorientation associated with navigating a 3-D space. This approach offers a significant improvement over traditional 2-D interfaces by providing a more immersive and contextually relevant viewing experience without the hardware demands and operational complexities of a fully navigable 3-D environment.

In some examples, the virtual camera manager 206-C effectively orchestrates multiple virtual cameras within the 3-D environment, each designated to capture distinct elements such as individual users (e.g., their avatars), conversation groups (comprising multiple user representations or avatars), and occasionally specific objects or items (e.g., shared documents or 3-D models). Each camera is configured to provide a fixed view, ensuring that the relevant users and/or objects are consistently presented within the scene. In scenarios where a single scene, such as a conversation group, contains numerous user representations that cannot be adequately captured by one camera, multiple virtual cameras may be deployed to comprehensively cover the scene. This setup allows for enhanced coverage and detail, ensuring no interactions are missed.

In some instances, to optimize the viewing experience on a 2-D interface, the virtual camera manager 206-C dynamically switches between different camera views. This automatic switching is particularly useful in conversation groups, where the focus may shift to the user who is actively speaking. By intelligently toggling between camera views based on the current speaker within a group, the virtual camera manager 2-6-C provides 2-D users with a seamless and engaging experience, closely mimicking the dynamics of real-world interactions. This capability not only enhances the clarity of communication but also enriches the overall user experience by maintaining visual engagement and context relevance.

Utilizing the insights obtained from the decomposition engine 206, the 2-D user interface engine 208 generates user interface elements to present to a user who may be using a phone 216, tablet 218, or laptop 220. Given that the screen real estate may be limited on some devices, particularly mobile phones, the user interface is designed to be intuitive and allow the user to quickly and efficiently navigate the 3-D space within the constraints of a 2-D display.

In some embodiments, the people, places, and things within the virtual environment are initially represented as interactive buttons within the 2-D user interface. For example, a user on a tablet 218 may see a series of buttons labeled with the names of different conversation groups or objects. Selecting one of these buttons could instantly bring up a 2-D view of the conversation group from a fixed virtual camera perspective, allowing the user to "join" the conversation. This view might include avatars of the users in the conversation group, along with visual indicators of who is currently speaking, and could also provide access to shared content such as documents or 3-D models being discussed.

For some objects, such as a PowerPoint presentation being shared within a virtual meeting space, a button within the 2-D interface could allow the user to view the presentation as if they were standing in front of it in the 3-D space. The system could render the presentation in a 2-D format appropriate for the user's device, allowing them to flip through slides or interact with the content as needed, while receiving an audio stream of any ongoing conversation.

The system 200 may ensure that each person, conversation group, object, and place within the 3-D environment is associated with one or more virtual cameras. These cameras capture various angles and perspectives, which are then processed by the 3-D to 2-D decomposition engine 206 to create a coherent 2-D representation. This representation is dynamically updated and streamed to the user's device, providing a live and interactive view of the virtual environment that is both accessible and engaging, even on devices with smaller screens. This approach allows for flexibility in implementation, accommodating variations in performance and cost considerations, thereby enhancing the patent's applicability and enforceability across different technological solutions and user scenarios.

Figure 3:
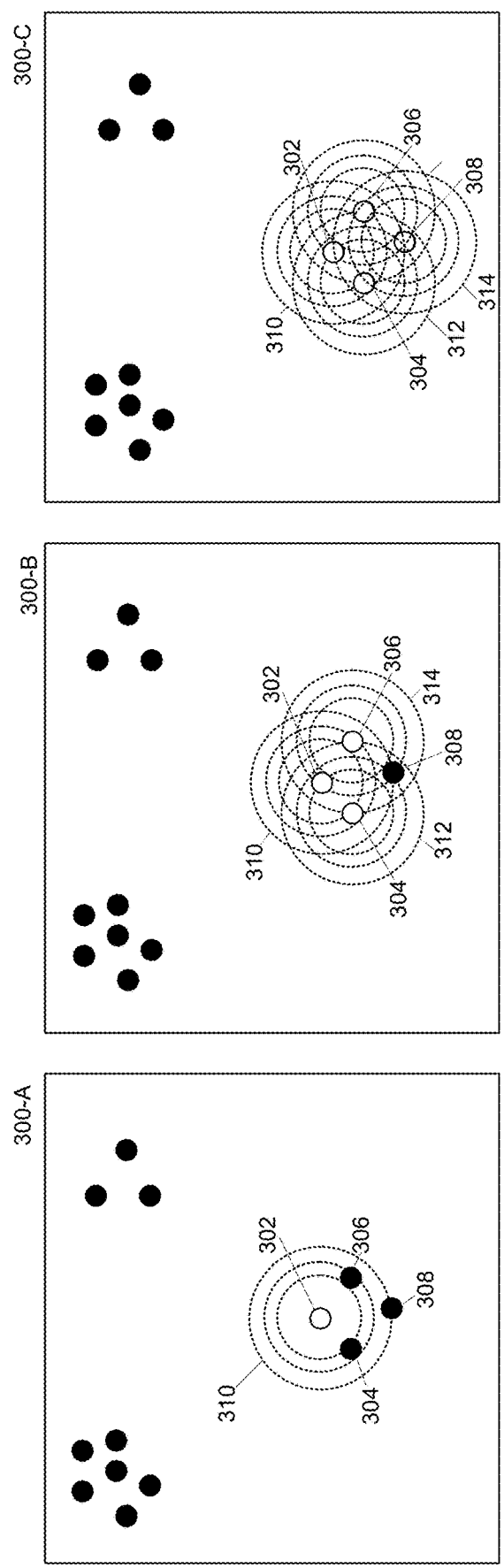
FIG. 3 is a diagram illustrating one example of a clustering algorithm used to determine when the representations of two or more persons in a 3-D virtual environment are to be interpreted as a conversation group when presented via a user interface in two-dimensions, consistent with some embodiments.

FIG. 3 is a diagram illustrating a clustering algorithm, referred to herein as the "Rule of Distance," as applied within a virtual space, where each small circle 302, 304, 306, and 308 represents the position of a person's avatar or representation in 3-D space. In some examples, this rule is a component in determining conversation groups among users in a virtual environment by analyzing the proximity of avatars to one another.

In the initial representation of the virtual space, shown as 300-A, the algorithm begins by selecting a first person, represented by avatar 302. The system calculates the distance from avatar 302 to all other avatars within the virtual space. The distance metric is based on a predefined threshold that considers avatars within a certain proximity to be potentially engaged in the same conversation group.

Once the distances are calculated, avatars that fall within the acceptable range of avatar 302 are tentatively grouped together. In this example, avatars 304 and 306 are determined to be close enough to avatar 302 to be included in the initial conversation group.

The process is then iteratively applied to the new members of the group, as depicted in 300-B. The algorithm now calculates the distance from each newly added avatar (e.g., 304 and 306) to all other avatars that have not yet been assigned to a group. If additional avatars are found to be within the proximity threshold of any group member, they are added to the group. In this case, avatar 308 is found to be close enough to avatar 306 and is thus included in the conversation group.

This iterative process continues until no new members can be added to the group based on the proximity rule, resulting in the final grouping shown in 300-C. At this stage, it has been established that avatars 302, 304, 306, and 308 are sufficiently close to one another to be considered part of the same conversation group.

By way of example, consider a virtual conference scenario where avatars 302, 304, 306, and 308 represent users who have navigated to a common area within the virtual space, such as near a virtual presentation screen. The "Rule of Distance" clustering algorithm would analyze their positions and determine that these users are likely to be engaged in a discussion about the presentation due to their proximity. Consequently, the system groups these avatars together, allowing for features such as shared audio channels or group messaging to facilitate their communication as if they were conversing in the same physical space.

The "Rule of Distance" clustering algorithm is an effective method for organizing users into conversation groups based on spatial relationships within a virtual environment. This approach enables the system to mimic natural social interactions by recognizing when users are likely to be interacting with one another and providing them with the tools to communicate effectively within the virtual space.

Figure 4:
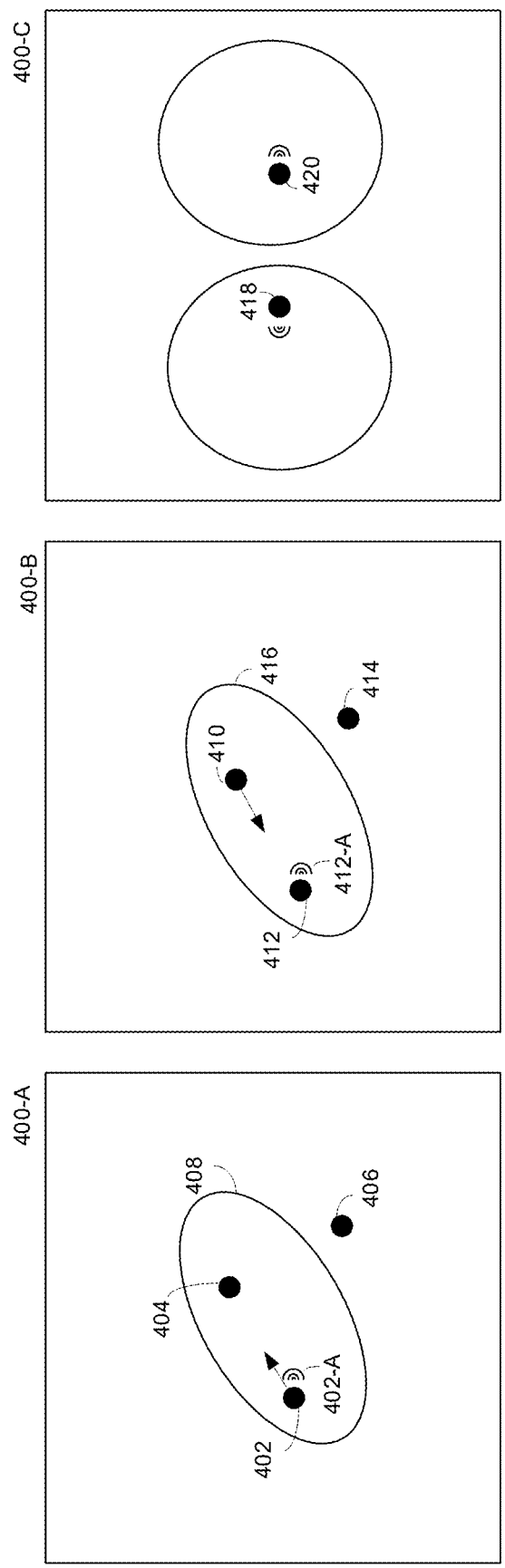
FIG. 4 is a diagram illustrating additional examples of clustering algorithms used to determine when the representations of two or more persons in a 3-D virtual environment are to be interpreted as a conversation group when presented via a user interface in two-dimensions, consistent with some embodiments.

FIG. 4 is a diagram illustrating additional examples of clustering algorithms used to determine when the representations of two or more persons in a 3-D virtual environment are to be interpreted as a conversation group when presented via a user interface in two-dimensions, consistent with some embodiments. FIG. 4 highlights an application of what is referred to as the "Rule of Talking" or "Rule of Gazing," a clustering technique for intelligently grouping user representations within a virtual space based, in part, on their interactions.

In some examples, the system analyzes the data structures of the 3-D virtual environment to identify the data representations of users, specifically focusing on their position, orientation, and current activity state. The current activity state of a user, for instance, may indicate whether they are talking, which is important for applying the "Rule of Talking."

In FIG. 4, box 400-A illustrates a specific interaction scenario within a 3-D virtual environment, demonstrating the application of the "Rule of Talking" and the "Rule of Gazing" to determine conversation groups. This portion of the figure focuses on three avatars, represented as small black circles, labeled as 402, 404, and 406, within a virtual space.

The avatar labeled 402 is depicted as actively speaking, as indicated by the graphic element 402-A, which symbolizes speech emanating from this avatar. Concurrently, an arrow extends from avatar 402 towards avatar 404, visually representing the direction of avatar 402's gaze and attention. This directional cue suggests that avatar 402 is not only speaking but is also visually engaging with avatar 404. According to the "Rule of Talking," the fact that avatar 402 is directing speech towards 404, combined with the orientation of 402's gaze, strongly implies a conversational engagement between these two avatars.

Further analysis involves examining the orientation data of avatar 404. If the data representation of avatar 404, as hypothetically stored in the system, also indicates that this avatar is facing towards avatar 402, the likelihood that they are engaged in a mutual conversation increases significantly. This mutual orientation and active engagement (talking and gazing) between avatars 402 and 404 fulfill the criteria set by the "Rule of Gazing," thereby categorizing them into the same conversation group, labeled as 408 in the diagram.

In contrast, avatar 406, although present in the same virtual vicinity, is not included in the conversation group 408. The exclusion of avatar 406 from this group is due to the lack of direct interaction cues with avatar 402. There is no indication, either through graphical elements or implied data, that avatar 402 is engaging with avatar 406. This absence of interaction is visually underscored by the lack of any connecting arrows or other symbols that might suggest communication or mutual attention between avatars 402 and 406.

This detailed depiction in box 400-A serves to illustrate how the system dynamically interprets and applies the rules of interaction to define conversation groups within a 3-D environment. By analyzing the orientation and activity states of avatars, the system can effectively group individuals into conversation groups or clusters based on their interactions. This capability enhances the realism and navigability of the virtual environment, allowing users to more naturally engage with each other in a manner that mirrors real-world social dynamics.

In FIG. 4, box 400-B provides a detailed visualization of another interaction scenario within a 3-D virtual environment, focusing on the dynamics of conversation grouping based on the "Rule of Gazing" and the activity status of the avatars. This section of the figure features three avatars, represented as black circles, labeled as 410, 412, and 414, each positioned within a virtual space to demonstrate the application of these rules.

The avatar labeled 412 is depicted with a graphical element 412-A, symbolizing that this avatar is actively speaking. The orientation of this speech is generally directed towards avatar 414, as indicated by the positioning and the directional focus of the graphical speech element. However, the interaction for conversation grouping in this scenario involves avatar 410. According to the system's analysis, avatar 410 is oriented towards avatar 412, suggesting that 410 is paying attention to the speaker 412. This orientation triggers the application of the "Rule of Gazing," which posits that if one avatar is looking towards another who is speaking, they are likely engaged in a conversation.

The system processes this interaction by analyzing the position data and orientation data of the avatars. For avatar 410, the system confirms that its orientation is directed towards the speaking avatar 412, thereby fulfilling one of the key criteria for forming a conversation group. Consequently, avatars 410 and 412 are grouped into a conversation group, as indicated by the label 416. This grouping is dynamically updated in real-time based on the continuous monitoring of avatar orientations and activity states within the virtual environment.

Regarding avatar 414, the inclusion in the conversation group 416 depends on its orientation relative to the speaker 412. If the orientation data for avatar 414, as stored and processed by the system, indicates that 414 is also facing towards 412, then it would be logical to include 414 in the conversation group 416. However, if 414's orientation data shows it is not directed towards 412, it remains outside of this specific conversation group, highlighting the system's capability to discern and dynamically adjust groupings based on the interaction rules defined.

This scenario in box 400-B illustrates the system's sophisticated approach to analyzing and interpreting the complex interplay of position, orientation, and activity data to form conversation groups in a 3-D virtual environment. By leveraging these data points, the system ensures that conversation groups are reflective of actual user interactions, thereby enhancing the user experience by providing a more structured and intuitive navigation within the virtual space. This process not only mimics real-world social interactions but also adapts to the nuances of virtual communication, ensuring that users can engage naturally and effectively within the digital realm.

In FIG. 4, box 400-C illustrates a specific interaction scenario within a 3-D virtual environment where two avatars, represented as black circles and labeled as 418 and 420, are depicted as engaging in simultaneous speech. This scenario is particularly focused on demonstrating the application of the "Rule of Talking" in the context of avatars who are continuously talking, potentially over each other, and how this affects the formation of conversation groups.

Both avatars 418 and 420 are shown with graphical elements indicating that they are actively speaking. Unlike previous examples where directional arrows might indicate a focused interaction towards another avatar, here the absence of such directional indicators suggests that their speech is not specifically directed at one another but rather occurs concurrently. This simultaneous talking scenario triggers the system's analysis under the "Rule of Talking," which posits that avatars who are continuously talking, particularly when talking over each other, have a lower likelihood of being grouped into the same conversation group.

The system processes this scenario by analyzing the activity status of each avatar, specifically identifying that both are in a state of continuous speech. The system then evaluates the lack of mutual engagement-neither avatar shows orientation or attention towards the other, despite their simultaneous talking. Based on these observations, the system determines that avatars 418 and 420 should not be grouped into the same conversation group due to the high likelihood that they are engaged in separate conversations or monologues, rather than interacting with each other.

This decision to not group these avatars together is dynamically reflected in the virtual environment's user interface, where each avatar might be visually or contextually separated to indicate their involvement in distinct conversational activities. This separation helps users of the system to understand the ongoing interactions more clearly and to choose their points of engagement more effectively within the virtual space.

Box 400-C effectively illustrates how the system utilizes specific rules related to speech patterns and avatar orientation to manage and structure conversation groups within a 3D environment. By recognizing and responding to scenarios where avatars are talking over each other, the system ensures that the grouping of avatars into conversation clusters is both logical and reflective of actual user interactions, thereby enhancing the overall coherence and navigability of the virtual environment. This approach not only maintains the integrity of individual conversations but also enhances the user experience by providing clear and structured interaction pathways within the digital realm.

Figure 5:
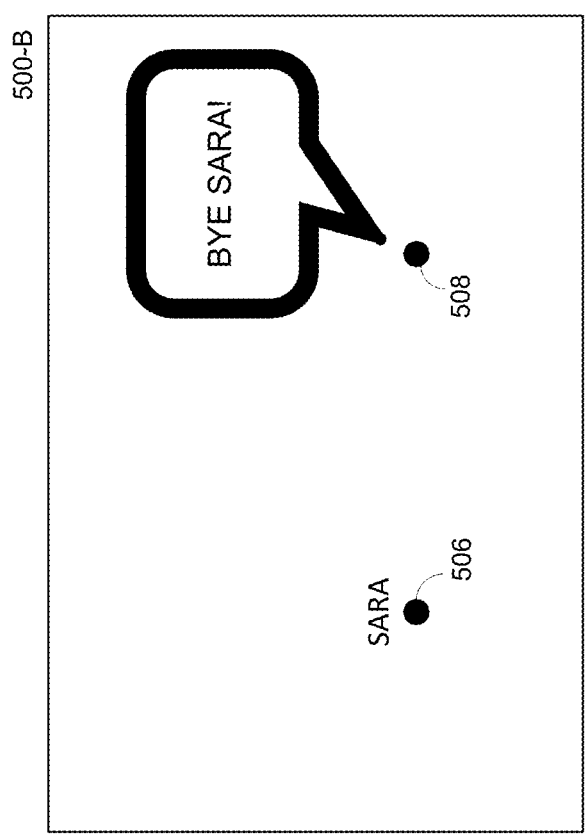
FIG. 5 is a diagram illustrating additional examples of clustering algorithms used to determine when the representations of two or more persons in a 3-D virtual environment are to be interpreted as a conversation group when presented via a user interface in two-dimensions, consistent with some embodiments.
Figure 5:
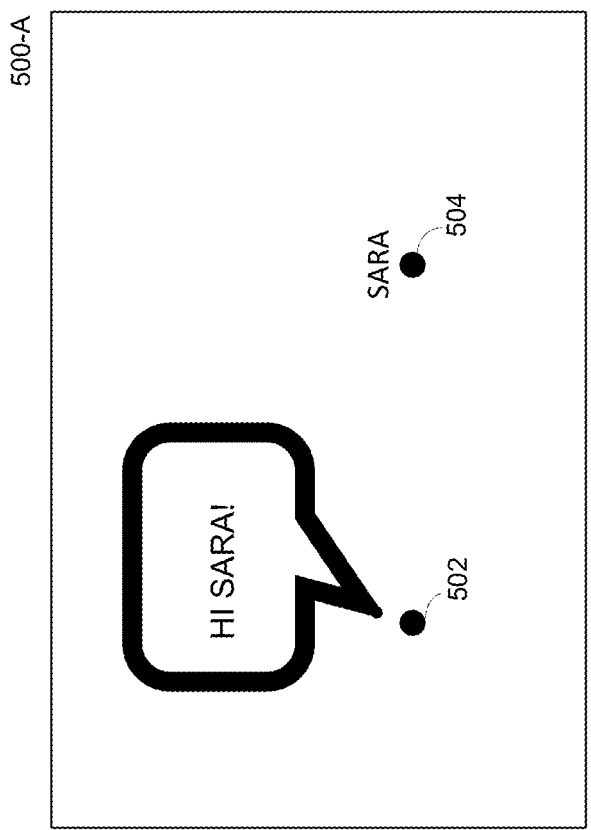

FIG. 5 is a diagram illustrating additional examples of clustering algorithms used to determine when the representations of two or more persons in a 3-D virtual environment are to be interpreted as a conversation group when presented via a user interface in two-dimensions, consistent with some embodiments. FIG. 5 specifically explores the application of a clustering technique referred to herein as the "Rule of Semantics." This rule, within the context of conversation grouping, enhances the system's ability to dynamically form groups based on verbal interactions among users.

In one scenario 500-A depicted in FIG. 5, the diagram shows a virtual environment where multiple avatars are present, each represented by a black circle. The focus is on two avatars, labeled as 502 and 504, where avatar 502 is illustrated as calling out the name "Sara," directed towards avatar 504. This action triggers the semantic analysis component of the system, which interprets the use of a direct name as a strong indicator of intentional communication between the two avatars.

The system processes this interaction by analyzing the speech content for semantic cues-specifically, the use of names and direct addresses. When avatar 502 uses the name "Sara," the system checks for the presence and orientation of an avatar labeled or recognized as "Sara" within the virtual space. Finding that avatar 504 corresponds to this name and is within a reasonable orientation and proximity to avatar 502, the system groups these two avatars into a conversation group, indicated by a visual or data-driven linkage in the user interface.

Another part of FIG. 5 illustrates a scenario 500-B where an avatar, labeled as 508, says "Bye Sara!" indicating a conclusion or exit from the interaction. This verbal cue is processed by the system under the "Rule of Semantics" to signify the end of avatar 506's participation in the current conversation group. The system then updates the conversation group dynamics by removing avatar 506 from the group that includes "Sara," reflecting this change in the virtual environment's user interface to aid users in understanding the flow and evolution of conversations.

This detailed depiction in FIG. 5 serves to illustrate how the system's sophisticated semantic analysis capabilities are employed to not only form but also dynamically adjust conversation groups based on the content of speech. By leveraging natural language processing techniques to interpret verbal interactions, the system ensures that conversation groups are reflective of actual user intentions and interactions, thereby enhancing the realism and navigability of the virtual environment. This approach allows users to engage more naturally and effectively within the digital realm, promoting a more intuitive and context-aware virtual interaction experience.

Figure 6:
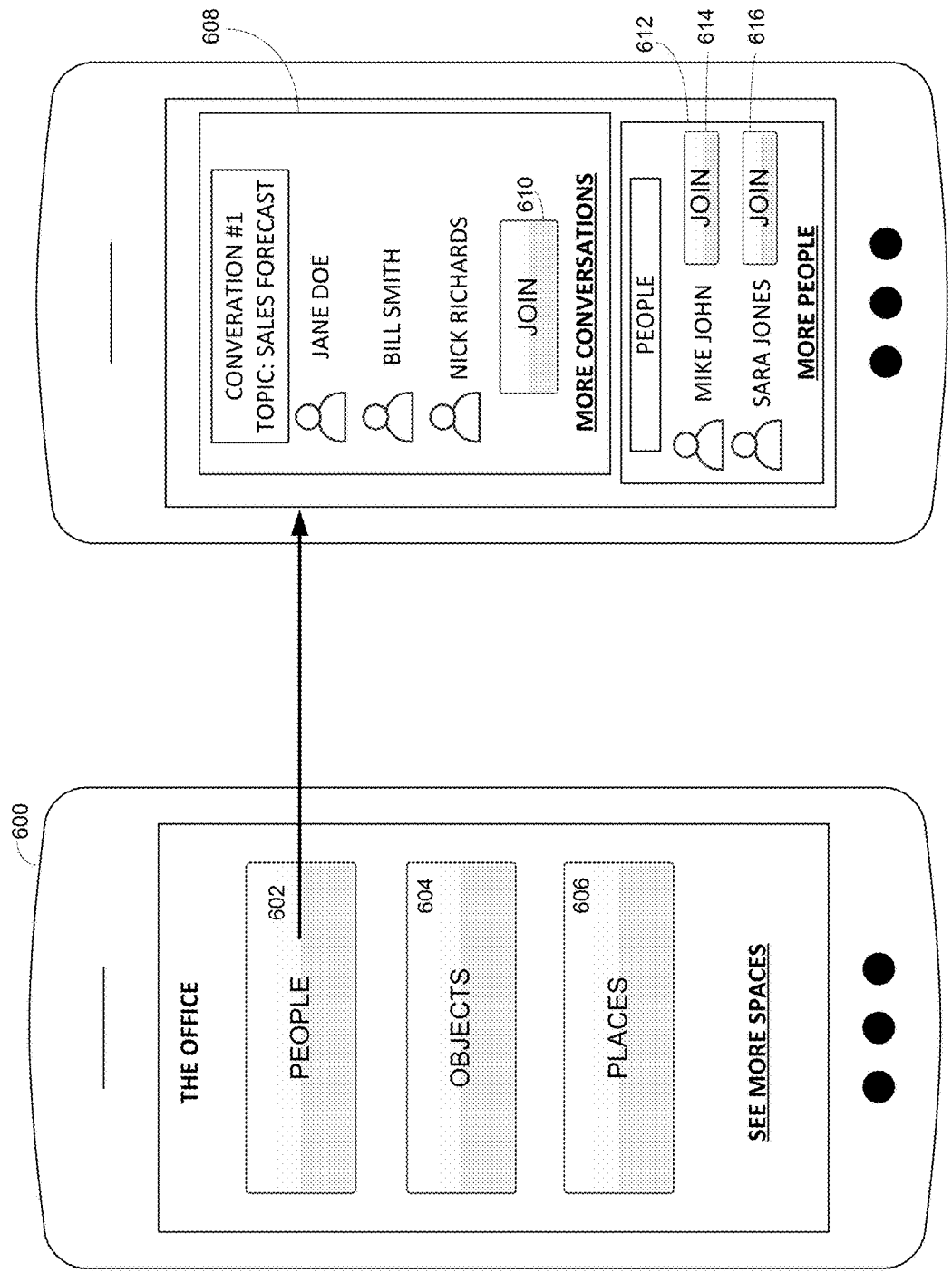
FIG. 6 is a diagram illustrating an example of a user interface that has been generated to allow a user of a conventional 2-D device to interact in a 3-D environment, consistent with some embodiments.

FIG. 6 is a diagram illustrating an example of a user interface that has been generated to allow a user of a conventional 2-D device to interact in a 3-D environment, consistent with some embodiments. This user interface is designed to bridge the gap between complex 3-D interactions and the more familiar 2-D navigation paradigms, thereby enhancing accessibility and usability for users without advanced 3-D capable hardware.

The device on the left, with reference number 600, displays a user interface that includes buttons or selectable elements labeled 602, 604, and 606, corresponding to "People," "Objects," and "Places," respectively. These elements serve as primary navigation aids, allowing users to interact with different aspects of the 3-D environment through a simplified 2-D interface.

By interacting with one of these buttons, for example, button 602 for "People," the interface updates to show a more detailed view of the available interactions within that category. In the detailed view labeled 608, the interface presents a specific conversation group comprising three participants: Jane Doe, Bill Smith, and Nick Richards. Adjacent to the depiction of this conversation group is a button labeled with the reference number 610, marked "Join." This button enables the user of the 2-D application to join the conversation group by simply selecting this button, thereby integrating them into the ongoing interaction within the 3-D environment.

Additionally, a link to "More Conversations," shown in the interface, allows the user to access additional conversation groups when selected. This feature enhances the user's ability to explore and engage with multiple conversation groups, thereby expanding their interaction possibilities within the virtual space, without complex navigation of the 3-D space itself, as might be expected of a 3-D user, using a 3-d capable device.

A separate section of the user interface displays individual people who are present in the 3-D environment. Each person is associated with a button labeled with their name, facilitating direct interaction, depending upon user settings. For instance, the button with reference 614 allows the user to initiate an online conversation with Mike John directly from the 2-D interface. Similarly, the button numbered 616 enables quick collaboration with Sara Jones. These individual interaction options provide users with the flexibility to engage in one-on-one conversations or to join larger group discussions, depending on their preference or the relevance of the discussions to their interests.

This user interface design, as illustrated in FIG. 6, exemplifies the capability to decompose complex 3-D scenes into manageable 2-D representations that retain the essence and interactive capabilities of the original 3-D environment. By providing structured navigation options such as conversation groups and individual interaction buttons, the system ensures that users can effectively participate in the 3-D virtual space without the need for sophisticated 3-D rendering on their devices. This approach not only democratizes access to mixed-reality technologies but also ensures that users with varying hardware capabilities, including those with visual or other impairments, can fully engage in the mixed-reality environment, thereby fostering a more inclusive digital ecosystem.

Figure 7:
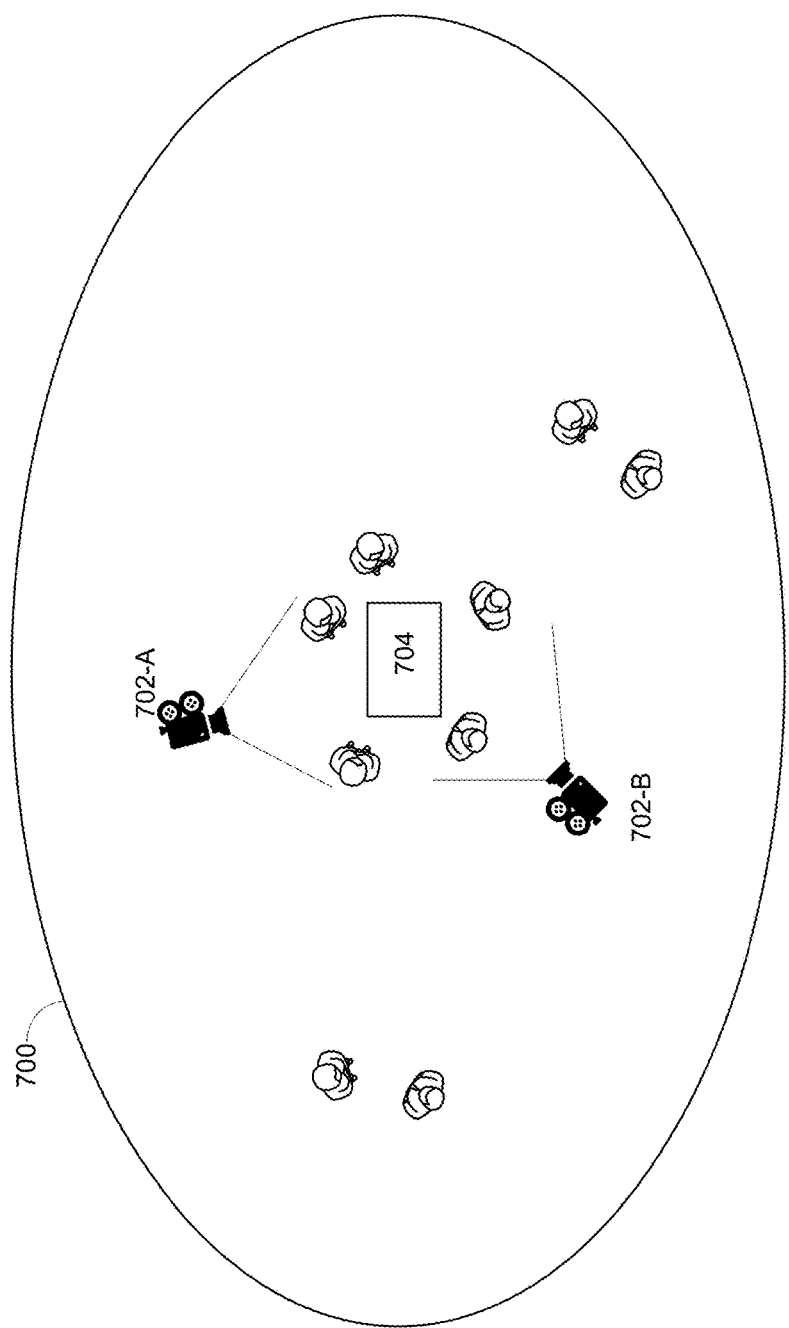
FIG. 7 a diagram illustrating an example of a virtual camera in a fixed position to generate a scene from a 3-D virtual environment for presentation in a user interface presented at a 2-D device, according to some embodiments.

FIG. 7 is a diagram illustrating an example of a virtual camera in a fixed position to generate a scene from a 3-D virtual environment for presentation in a user interface presented at a 2-D device, according to some embodiments. This figure exemplifies how the invention facilitates the translation of complex 3-D interactions into accessible 2-D visual representations, enhancing user engagement across different device capabilities.

In the depicted scenario within FIG. 7, a virtual environment 700 is shown, including an object with reference number 704. This object acts as a focal point around which several avatars, representing users, have gathered. The object could be anything of interest within the virtual environment, such as a piece of art, a digital artifact, or an interactive element crucial for collaborative activities.

To effectively present this 3-D scene on a 2-D interface, the system employs virtual cameras, such as those illustrated with reference numbers 702-A and 702-B. These cameras are strategically positioned and oriented by the system to capture comprehensive views of the scene. The positioning and orientation of these virtual cameras are determined by the software based on several factors, including the significance of the object, the distribution of the avatars around it, and the intended interaction dynamics.

The virtual cameras 702-A and 702-B create views that are then rendered into a 2-D format suitable for display on conventional devices such as smartphones, tablets, or desktop computers. This rendering process involves simplifying the 3-D spatial relationships and interactions into a more digestible 2-D visual format while retaining the essential elements and dynamics of the scene. This allows users of the 2-D interface to comprehend and interact with the 3-D environment effectively, without the need for complex navigation controls or 3-D rendering capabilities on their devices.

The user interface, as illustrated in FIG. 6, can be utilized in conjunction with the views generated by virtual cameras 702-A and 702-B. Users can quickly navigate to specific objects or interaction points within the 3-D environment by selecting corresponding options on the 2-D interface. Upon selecting a virtual camera view, the user is presented with a simplified yet informative perspective of the ongoing interactions around the focal object. This feature is particularly beneficial for users who need to engage with the 3-D environment but either do not have access to 3-D capable hardware or prefer the simplicity of a 2-D interface.

This implementation of virtual cameras and the dynamic generation of 2-D views from a 3-D environment exemplify the invention's capability to bridge the gap between complex virtual interactions and user-friendly interfaces. By providing a mechanism to view and interact with 3-D environments through a simplified 2-D perspective, the invention democratizes access to mixed-reality content, ensuring that users with diverse needs and hardware capabilities can participate fully in the digital experience. This approach not only enhances accessibility but also expands the usability of mixed-reality environments across various user demographics and technological contexts.

Machine and Software Architecture

Figure 8:
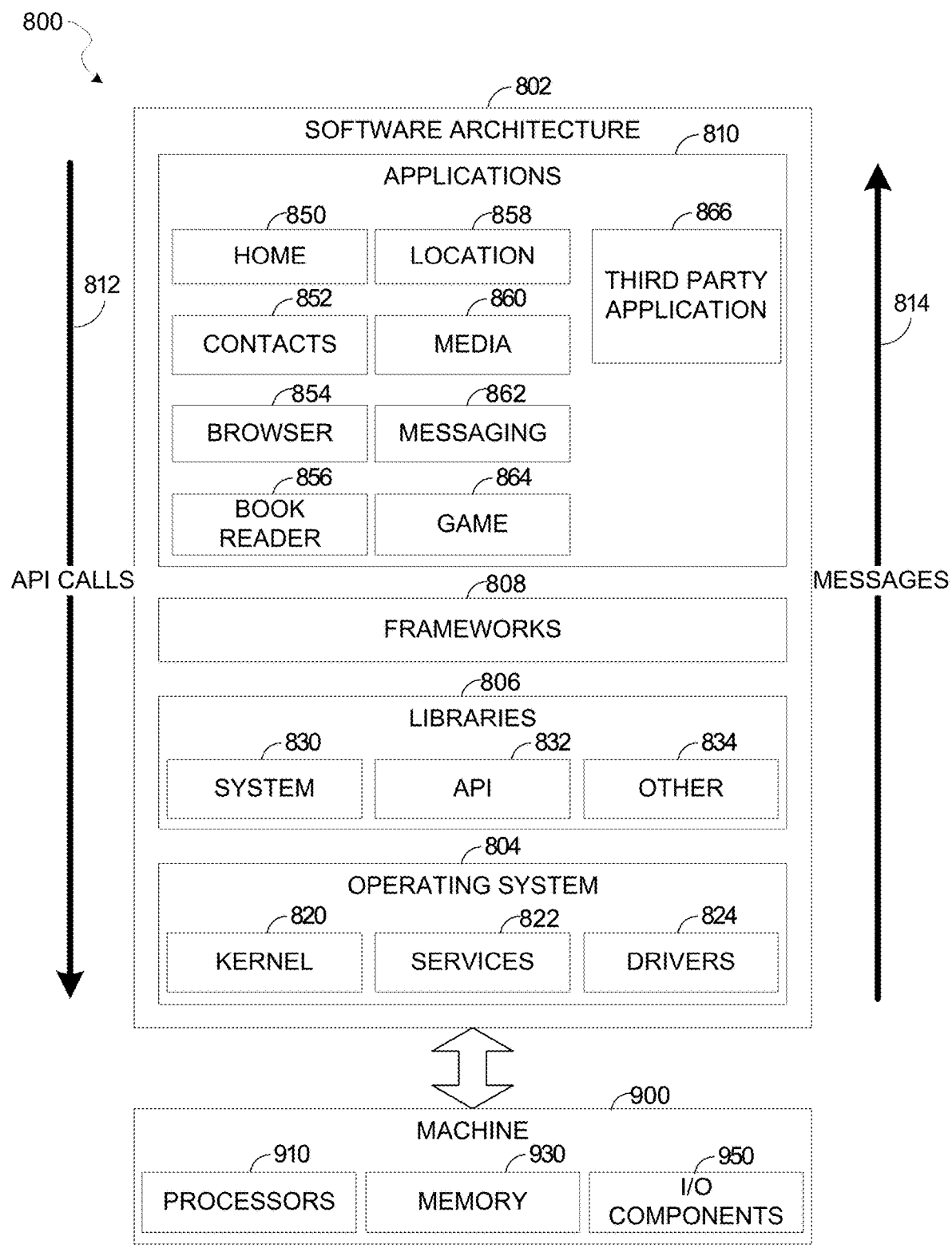
FIG. 8 is a block diagram illustrating a software architecture, which can be installed on any of a variety of computing devices to perform methods consistent with those described herein.

FIG. 8 is a block diagram 800 illustrating a software architecture 802, which can be installed on any of a variety of computing devices to perform methods consistent with those described herein. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 902 includes layers such as an operating system 804, libraries 806, frameworks 808, and applications 810. Operationally, the applications 810 invoke API calls 812 through the software stack and receive messages 814 in response to the API calls 812, consistent with some embodiments.

In various embodiments, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various GUI functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 866 can invoke the API calls 812 provided by the operating system 804 to facilitate functionality described herein.

Figure 9:
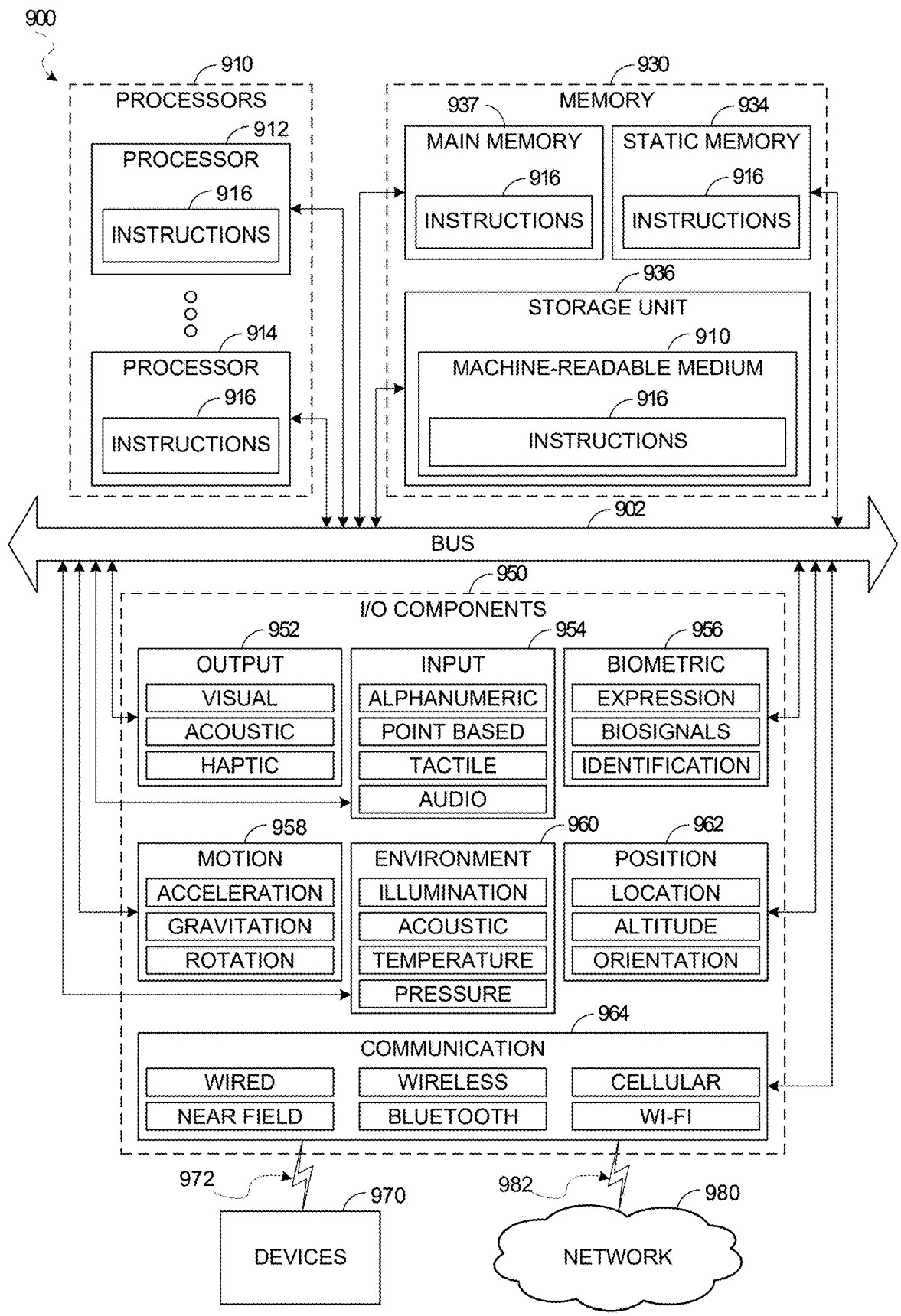
FIG. 9 is a diagrammatic representation of a machine in the form of a computer system (e.g., a server computer) within which a set of instructions may be executed for causing the machine to perform any one or more of the methodologies discussed herein, according to an example embodiment.

FIG. 9 illustrates a diagrammatic representation of a machine 900 in the form of a computer system within which a set of instructions may be executed for causing the machine to perform any one or more of the methodologies discussed herein, according to an example embodiment. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example the instructions 916 may cause the machine 900 to execute any one of the methods or algorithmic techniques described herein. Additionally, or alternatively, the instructions 916 may implement any one of the systems described herein. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions contemporaneously. Although FIG. 9 shows multiple processors 910, the machine 900 may include a single processor with a single core, a single processor with multiple cores (e.g., a multi-core processor), multiple processors with a single core, multiple processors with multiples cores, or any combination thereof.

The memory 930 may include a main memory 932, a static memory 934, and a storage unit 936, all accessible to the processors 910 such as via the bus 902. The main memory 930, the static memory 934, and storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile devices will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a USB).

Moreover, the communication components 964 may detect identifiers or include components operable to detect identifiers. For example, the communication components 964 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 930, 932, 934, and/or memory of the processor(s) 910) and/or storage unit 936 may store one or more sets of instructions and data structures (e.g., software) embodying or utilized by any one or more of the methodologies or functions described herein. These instructions (e.g., the instructions 916), when executed by processor(s) 910, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 980 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., HTTP). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

We claim:

1. A computer-implemented method for providing cross-device access to a virtual environment, the method comprising:
   processing a data model of a three-dimensional (3D) environment to generate a first visual representation of the 3D environment for presentation at a first computing device, the first visual representation generated using a perspective view adapted for immersive 3D environments;
   processing the data model of the 3D environment to generate a second visual representation of the data model of the 3D environment for presentation at a second computing device, the second visual representation generated with orthographic representation for display on a non-immersive two-dimensional interface;
   causing a menu interface to be presented at the second computing device, the menu interface comprising selectable elements corresponding to conversation groups identified within the data model of the 3D environment, wherein the conversation groups are determined based on positions and orientations of user representations within the 3D environment;
   in response to detecting selection of a selectable element corresponding to a particular conversation group:
      generating, for presentation via the first visual representation at the first computing device, a 3D representation of a user of the second computing device positioned within the particular conversation group; and
      generating, for presentation via the second visual representation at the second computing device, a 2D view of the particular conversation group; and
      enabling bidirectional communication between the user of the second computing device and users in the particular conversation group by:
         receiving communication input via the second computing device, and
         propagating the communication input to the first computing device for presentation within the immersive virtual environment.

2. The computer-implemented method of claim 1, wherein determining the conversation groups comprises:
   selecting a first user representation as a starting point for a conversation group;
   including other user representations in the conversation group with the first user if a distance between their positions falls within a predetermined distance threshold;
   for each newly included user representation in the conversation group, applying the predetermined distance threshold to include additional user representations within the distance threshold from any user representation already in the conversation group; and
   continuing iteratively until no further user representations can be included within the conversation group based on the predetermined distance threshold.

3. The computer-implemented method of claim 1, wherein determining the conversation groups comprises:
   identifying a first user representation having position data and orientation data indicating the first user representation is facing towards and positioned within a predefined distance from a second user representation;
   determining that at least one of the first or second user representations has a current activity state indicating active communication via voice or text-based chat; and
   grouping the first and second user representations into a conversation group based on the position data, orientation data, and current activity state.

4. The computer-implemented method of claim 1, wherein determining the conversation groups comprises:
   analyzing a communication associated with a first user representation to detect an initial salutation or greeting expression that includes a reference to a name of a second user; and
   forming a conversation group to include the first and second users when the initial salutation or greeting expression is directed towards the second user with reference to the name.

5. The computer-implemented method of claim 4, further comprising:
   analyzing a communication associated with a user representation within a conversation group to detect a parting salutation or farewell expression that includes a reference to a name of another user in the conversation group; and
   removing from the conversation group the user who initiated the parting salutation or farewell expression.

6. The computer-implemented method of claim 1, wherein generating the 3D representation of the user of the second computing device comprises:
   creating the 3D representation as one of a 3D avatar, a 2D image, or a video stream; and
   presenting the 3D representation in a manner that conveys to users in the particular conversation group that the user is participating via a non-immersive interface.

7. The computer-implemented method of claim 1, wherein enabling bidirectional communication comprises:
   determining communication channels in use by users within the particular conversation group, the communication channels comprising at least one of audio or text-based messaging; and
   enabling hardware resources on the second computing device to allow the user to collaborate using the determined communication channels.

8. The computer-implemented method of claim 1, further comprising:
   analyzing an object within the data model to determine a position and orientation of the object;
   presenting a selectable element to indicate the existence of the object when the object is detected within a predetermined distance threshold from user representations in a conversation group; and
   in response to detecting selection of the selectable element, updating the second visual representation with a depiction of the object.

9. The computer-implemented method of claim 8, further comprising:
   detecting gestures made by users within the 3D environment related to an object;
   determining intersection points of ray casts initiated by the detected gestures with the object;
   converting the determined intersection points into screen positions for the second visual representation; and
   updating the second visual representation to reflect a translation of the user gestures.

10. The computer-implemented method of claim 8, further comprising:
    analyzing communications associated with a conversation group to detect references to an object positioned within a predefined distance threshold of at least one user in the conversation group;

upon detecting a reference to the object, automatically updating the second visual representation to display the object; and dynamically toggling between different views based on the substance of the communications.

11. A system for providing cross-device access to a virtual environment, comprising: one or more processors;

a memory storage device storing instructions thereon, which, when executed by the one or more processors, cause the system to perform operations comprising:

processing a data model of a three-dimensional (3D) environment to generate a first visual representation of the 3D environment for presentation at a first computing device, the first visual representation generated using a perspective view adapted for immersive 3D environments;

processing the data model of the 3D environment to generate a second visual representation of the data model of the 3D environment for presentation at a second computing device, the second visual representation generated with orthographic representation for display on a non-immersive two-dimensional interface;

causing a menu interface to be presented at the second computing device, the menu interface comprising selectable elements corresponding to conversation groups identified within the data model of the 3D environment, wherein the conversation groups are determined based on positions and orientations of user representations within the 3D environment;

in response to detecting selection of a selectable element corresponding to a particular conversation group:
generating, for presentation via the first visual representation at the first computing device, a 3D representation of a user of the second computing device positioned within the particular conversation group; and generating, for presentation via the second visual representation at the second computing device, a 2D view of the particular conversation group; and enabling bidirectional communication between the user of the second computing device and users in the particular conversation group by:
receiving communication input via the second computing device, and propagating the communication input to the first computing device for presentation within the immersive virtual environment.

12. The system of claim 11, wherein determining the conversation groups comprises:

selecting a first user representation as a starting point for a conversation group;

including other user representations in the conversation group with the first user if a distance between their positions falls within a predetermined distance threshold;

for each newly included user representation in the conversation group, applying the predetermined distance threshold to include additional user representations within the distance threshold from any user representation already in the conversation group; and continuing iteratively until no further user representations can be included within the conversation group based on the predetermined distance threshold.

13. The system of claim 11, wherein determining the conversation groups comprises:

identifying a first user representation having position data and orientation data indicating the first user representation is facing towards and positioned within a predefined distance from a second user representation;

determining that at least one of the first or second user representations has a current activity state indicating active communication via voice or text-based chat; and grouping the first and second user representations into a conversation group based on the position data, orientation data, and current activity state.

14. The system of claim 11, wherein determining the conversation groups comprises:

analyzing a communication associated with a first user representation to detect an initial salutation or greeting expression that includes a reference to a name of a second user; and forming a conversation group to include the first and second users when the initial salutation or greeting expression is directed towards the second user with reference to the name.

15. The system of claim 14, wherein the instructions, when executed by the one or more processors, cause the system to perform operations comprising:

analyzing a communication associated with a user representation within a conversation group to detect a parting salutation or farewell expression that includes a reference to a name of another user in the conversation group; and removing from the conversation group the user who initiated the parting salutation or farewell expression.

16. The system of claim 11, wherein generating the 3D representation of the user of the second computing device comprises:

creating the 3D representation as one of a 3D avatar, a 2D image, or a video stream; and presenting the 3D representation in a manner that conveys to users in the particular conversation group that the user is participating via a non-immersive interface.

17. The system of claim 11, wherein enabling bidirectional communication comprises:

determining communication channels in use by users within the particular conversation group, the communication channels comprising at least one of audio or text-based messaging; and enabling hardware resources on the second computing device to allow the user to collaborate using the determined communication channels.

18. The system of claim 11, wherein the instructions, when executed by the one or more processors, cause the system to perform operations comprising:

analyzing an object within the data model to determine a position and orientation of the object;

presenting a selectable element to indicate the existence of the object when the object is detected within a predetermined distance threshold from user representations in a conversation group; and in response to detecting selection of the selectable element, updating the second visual representation with a depiction of the object.

19. The system of claim 18, wherein the instructions, when executed by the one or more processors, cause the system to perform operations comprising:

detecting gestures made by users within the 3D environment related to an object;

determining intersection points of ray casts initiated by the detected gestures with the object;

converting the determined intersection points into screen positions for the second visual representation; and updating the second visual representation to reflect a translation of the user gestures.

20. A memory storage device storing instructions thereon, which, when executed by one or more processors, cause a system to perform operations comprising:

processing a data model of a three-dimensional (3-D) environment to generate a first visual representation of the 3-D environment for presentation at a first computing device, the first visual representation generated using a perspective view adapted for immersive 3-D environments;

processing the data model of the 3-D environment to generate a second visual representation of the data model of the 3-D environment for presentation at a second computing device, the second visual representation generated with orthographic representation for display on a non-immersive two-dimensional interface;

causing a menu interface to be presented at the second computing device, the menu interface comprising selectable elements corresponding to conversation groups identified within the data model of the 3-D environment, wherein the conversation groups are determined based on positions and orientations of user representations within the 3-D environment;

in response to detecting selection of a selectable element corresponding to a particular conversation group:

generating, for presentation via the first visual representation at the first computing device, a 3-D representation of a user of the second computing device positioned within the particular conversation group; and generating, for presentation via the second visual representation at the second computing device, a 2-D view of the particular conversation group; and enabling bidirectional communication between the user of the second computing device and users in the particular conversation group by:

receiving communication input via the second computing device, and propagating the communication input to the first computing device for presentation within the immersive virtual environment.

\* \* \* \* \*